United States Patent
Ito et al.

(10) Patent No.: US 6,470,770 B2
(45) Date of Patent: Oct. 29, 2002

(54) POWER SYSTEM FOR VEHICLE

(75) Inventors: Katsuhiko Ito; Kunihiko Fukui; Yoshihiro Yoshida, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/867,392

(22) Filed: May 31, 2001

(65) Prior Publication Data

US 2002/0010048 A1 Jan. 24, 2002

(30) Foreign Application Priority Data

May 31, 2000 (JP) ........................................ 2000-163677

(51) Int. Cl.[7] .............................................. F16H 47/02
(52) U.S. Cl. ..................................... 74/730.1; 74/606 R
(58) Field of Search .............................. 74/730.1, 732.1, 74/733.1, 606 R (56) References Cited

U.S. PATENT DOCUMENTS

| | | | |
|---|---|---|---|
| 4,431,073 A | * 2/1984 | Nagao et al. | ......... 74/730.1 X |
| 5,125,291 A | * 6/1992 | Makita et al. | ............ 74/730.1 |
| 5,913,950 A | * 6/1999 | Matsufuji | ................. 74/730.1 |
| 6,189,410 B1 | * 2/2001 | Inoue | ...................... 74/606 R |

FOREIGN PATENT DOCUMENTS

| | | | |
|---|---|---|---|
| JP | 1288663 | * 11/1989 | ............... 74/606 R |
| JP | 7-23746 | 3/1995 | |
| JP | 8-26930 | 3/1996 | |

* cited by examiner

*Primary Examiner*—Rodney H. Bonck
*Assistant Examiner*—Ha Ho
(74) *Attorney, Agent, or Firm*—Birch, Stewart, Kolasch & Birch, LLP

(57) ABSTRACT

In a power system for a vehicle, the line segment L connecting between the center O1 of a driving shaft (speed change shaft) of an oil hydrostatic non-stage transmission and the center O2 of a ball screw (ratio change driving shaft) of a ratio change mechanism is set parallel to the mating plane P of the crank case and the cylinder block, while the axis C2 of a detecting shaft is disposed coaxially with the turning axis C1 of a swash plate holder orthogonal to the line segment L, and, in this condition, a ratio detecting sensor is bolted to an upper wall. Wherein the axis C2 of the detecting shaft is set parallel to the cylinder axis C0, and the machining axis for a crank chamber and the machining axis for a fitting portion for the ratio detecting sensor are set parallel to each other.

12 Claims, 7 Drawing Sheets

POWER SYSTEM FOR VEHICLE

BACKGROUND OF THE INVENTION

1. Field of the Invention

The present invention relates to a power system for a vehicle comprising a swash plate type oil hydrostatic non-stage transmission, and particularly to an advantageous layout of a ratio change mechanism in the swash plate type oil hydrostatic non-stage transmission.

2. Description of Background Art

A swash plate type oil hydrostatic non-stage transmission in which an oil hydraulic pump on the input side and an oil hydraulic motor on the output side are disposed coaxially and connected to each other by an oil hydraulic circuit wherein the volume ratio of the oil hydraulic pump and the oil hydraulic motor is varied to enable non-stage speed change. The inclination angle of a speed change swash plate is provided coaxially with the oil hydraulic pump and the oil hydraulic motor and is varied by a ratio change mechanism to thereby vary the change gear ratio. (See, for example, Japanese Patent Publications No. Hei 7-23746 and No. Hei 8-26930).

Figure 7:
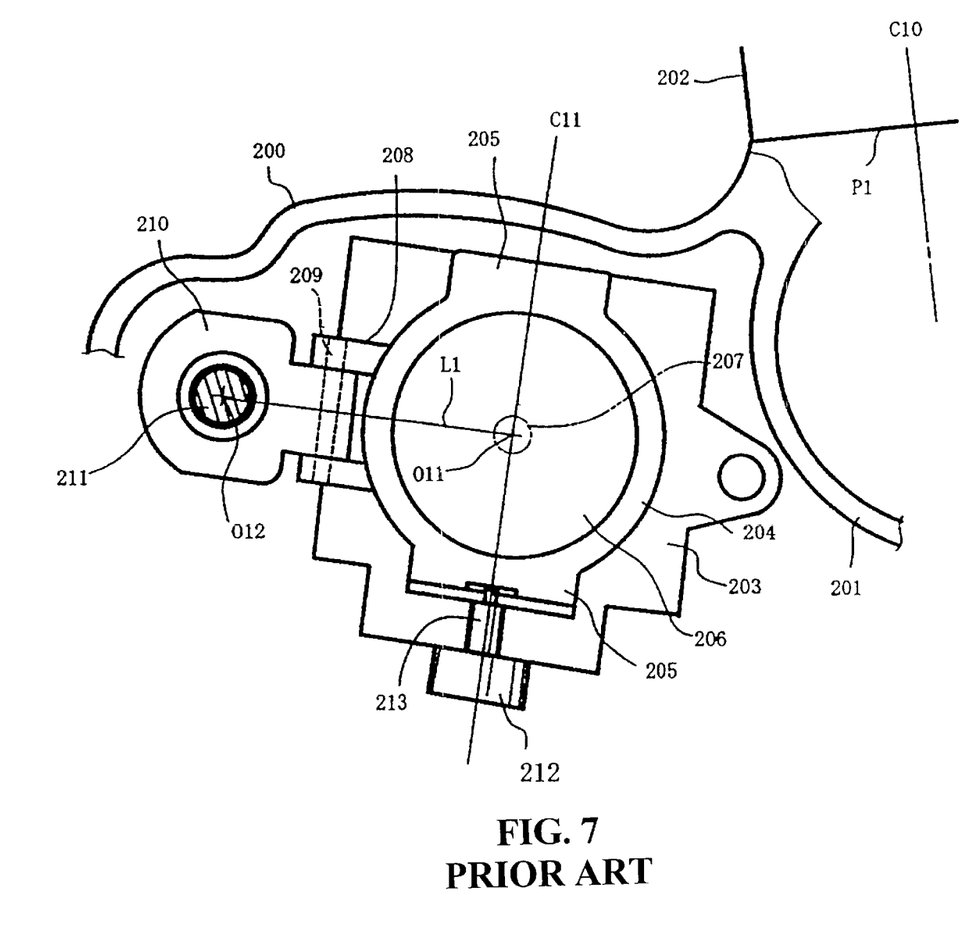
FIG. 7 is a general view of portions similar to those in FIG. 6, according to an example of the prior art.

FIG. 7 is a general view showing a swash plate type oil hydrostatic non-stage transmission according to the prior art, as viewed from the speed change shaft direction. In FIG. 7, a lower end portion of a cylinder 202 is fitted to an upper end portion of a crank chamber wall 201 formed in a crank case 200 to form a mating plane P1, and the cylinder axis C10 is orthogonal to the mating plane P. The cylinder axis C10 is the center line of the cylinder bore.

A transmission fixing wall 203 is provided in the crank case 202 on the outside of the crank chamber, and a turning shaft 205 formed as a part of and integrally with a speed change swash plate 204 is turnably supported on the wall 203. One end of a main body portion 206 of the swash plate type oil hydrostatic non-stage transmission is in slidable contact with the speed change swash plate 204, and a changed speed is outputted from a speed change shaft 207.

A ratio change mechanism disposed on a lateral side of the main body portion 206 comprises the speed change swash plate 204, a slider 210 connected through a shaft 209 to a projected portion 208 formed on the speed change swash plate 204, and a ratio change driving shaft 211 supporting the slider 210. The ratio change driving shaft 211 is a ball screw disposed in parallel with the speed change shaft 207 and driven to rotate by a motor (not shown), and rotation of the ball screw causes the slider 210 to move in the axial direction, whereby the inclination angle of the speed change swash plate 204 is varied.

Further, in order to detect the turning angle of the speed change swash plate 204, a ratio detecting sensor 212 is fitted to the transmission fixing wall 203 on the lower side of the main body portion 206. The ratio detecting sensor 212 is a potentiometer, of which a detecting shaft 213 serving as a detecting portion projects to the upper side and is connected to the turning shaft 205 of the speed change swash plate 204, and is turned around the axis by the same turning angle as the speed change swash plate 204 to thereby detect the turning angle of the speed change swash plate 204.

For simplifying the structure of the ratio detecting sensor 212, it is necessary that the detecting shaft 213 can directly detect the turning of the speed change swash plate 204, and, therefore, the axis of the detecting shaft 213 is disposed coaxially with the axis C11 of the turning shaft 205. Further, the axes of the detecting shaft 213 and C11 are roughly orthogonal to a line segment L1 connected between the centers O11 and O12 of the speed change shaft 207 and the ratio change driving shaft 211, and are inclined relative to the cylinder axis C10. In addition, the line segment L1 also skewly intersects the cylinder axis C10, and is inclined relative to the mating plane P1.

Meanwhile, in the power transmission device constituted as above, the axis of the detecting shaft 213 serves also as a fitting axis of the ratio detecting sensor 212. In the prior art, there is no special consideration on the direction of the fitting axis of the detecting shaft 213, and the fitting axis of the detecting shaft 213 is inclined relative to the mating plane P1 of the crank case and the cylinder. Since the fitting axis of the detecting shaft 213 and the cylinder axis C10 are different in direction, mechanical working or machining after formation of the crank case 200 by the casting or the like is carried out as follows. First, the inside of the crank chamber is machined in parallel to the cylinder axis C10 from the side of the mating plane P1 of the crank case and the cylinder, and then a fitting portion for the ratio detecting sensor 212 is machined; in this case, the machining axes of the two machining operations differ from each other.

As a result, in actual machining, the crank case 200 is positioned on jigs so that the machining axis of a machining device (not shown) coincides with the cylinder axis C10, then machining of the crank chamber is carried out, thereafter the machining is stopped, and the crank case must be repositioned on jigs so that the machining axis (C12) for the fitting portion for the ratio detecting sensor 212 coincides with the machining axis of the machining device, before the fitting portion for the ratio detecting sensor is machined. Therefore, the machining process takes much time and labor, and enhancement of workability is requested. Accordingly, it is an object of the present invention to solve such problems.

SUMMARY AND OBJECTS OF THE INVENTION

In order to solve the above-mentioned problems, the present invention pertaining to a power system for a vehicle in which a rotational output of an engine is decelerated and transmitted to a driving wheel by a swash plate type oil hydrostatic non-stage transmission, the inclination angle of a speed change swash plate provided in the swash plate type oil hydrostatic non-stage transmission is varied by a ratio change mechanism to vary the change gear ratio, and the variation of the change gear ratio is detected by a ratio detecting sensor having a detecting member moved in conjunction with the speed change swash plate wherein the ratio change mechanism comprises a ratio change driving shaft parallel with a speed change output shaft of the swash plate type oil hydrostatic non-stage transmission, and the ratio change mechanism is so disposed that a line segment connected between the axes of the ratio change driving shaft and the speed change output shaft is parallel with a mating plane between the crank case and the cylinder.

According to the present invention, the ratio change mechanism is so disposed that the line segment connecting between the center of the ratio change driving shaft and the center of the speed change output shaft is parallel with the mating plane between the crank case and the cylinder, and, therefore, the machining axis for the ratio detecting sensor fitting portion of the crank case is parallel to the cylinder axis. As a result, the machining axis for the ratio detecting sensor fitting portion and the machining axis for the crank chamber are parallel to each other, and the components or portions can be machined from the same direction.

Accordingly, it is needless to once stop machining after machining of the crank chamber, reposition the crank case on jigs, and resume machining for the ratio detecting sensor fitting portion, as in the prior art. Thus, the two works or portions can be machined with a single positioning, so that time and labor for positioning in machining can be reduced, and operability is remarkably enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment applied to a four-wheel buggy car will be described referring to the drawings. First, the overall structure of a four-wheel buggy car will be outlined, referring to FIG. 2. The four-wheel buggy car comprises left-right pairs of front wheels 2 and rear wheels 3 at front and rear portions of a vehicle body frame 1, and a power unit 4 comprising a four-cycle engine and a speed change gear as one body is supported at a central portion of the vehicle body frame 1. The power unit 4 is of a longitudinal layout type in which a crank shaft 5 is directed along the longitudinal direction. The four-wheel buggy car is of a four wheel drive type in which, by an output shaft 6 disposed at a lower portion of the power unit 4 in parallel with the crank shaft 5, front wheels 2 are driven through a front wheel propeller shaft 7 and rear wheels 3 are driven through a rear wheel propeller shaft 8.

Figure 2:
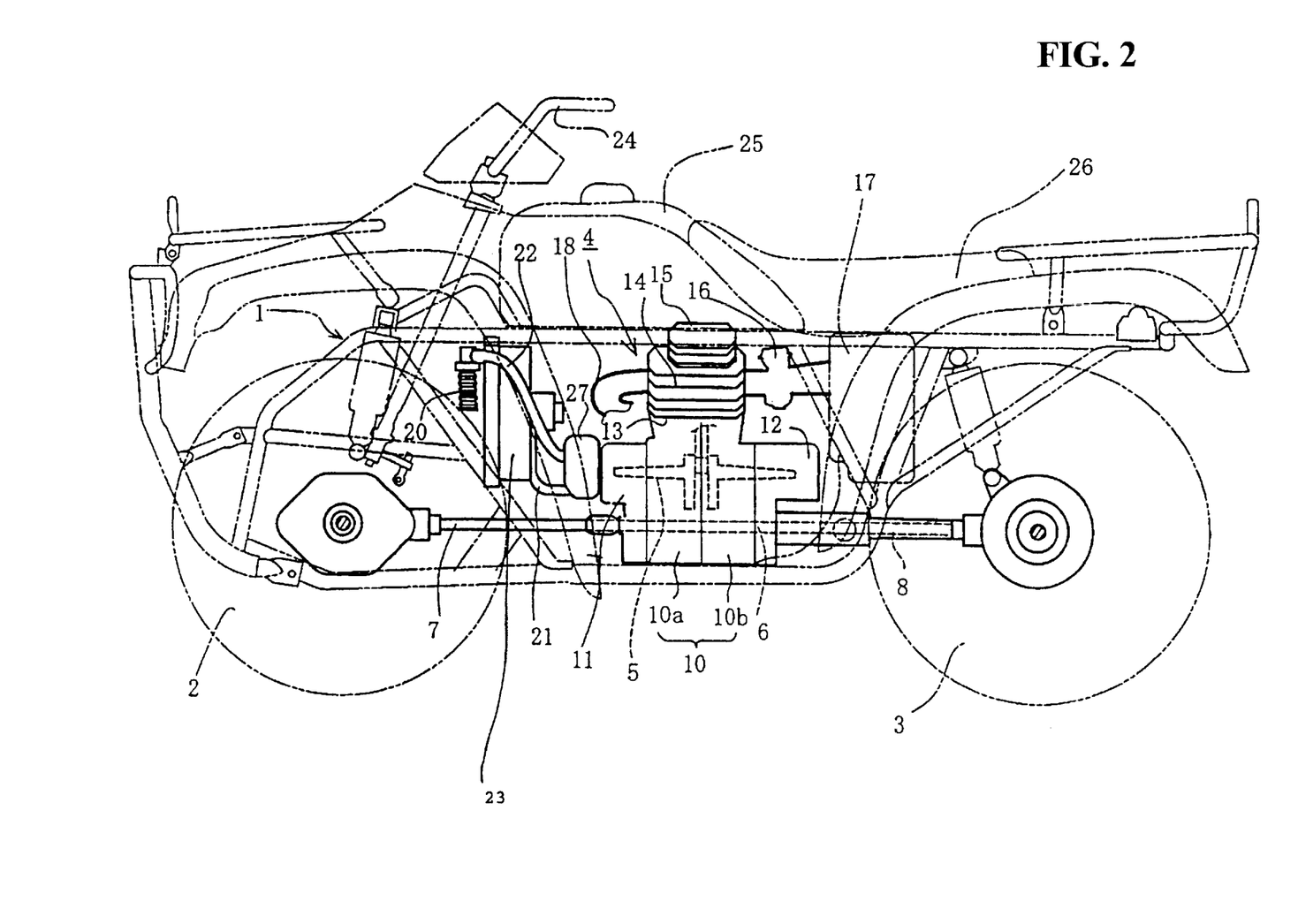
FIG. 2 is a side view of a major part of the vehicle body of a four-wheel buggy car to which the present invention is applied.

The front side of a crank case 10 constituting the power unit 4 is covered by a front case cover 11, while the rear side is covered by a rear case cover 12, and these constitute a power unit case. The crank case 10 is divided into a front case 10a and a rear case 10b.

A cylinder block 13, a cylinder head 14 and a cylinder head cover 15 are fitted to an upper portion of the crank case 10, a carburetor 16 is connected to an intake port of the cylinder head 14, and an air cleaner 17 is connected to the carburetor 16 from the rear side. An exhaust pipe 18 is connected to an exhaust port of the cylinder head 14.

An oil cooler 20 is disposed on the front side of the power unit 4 and is in communication with an oil pump provided in the crank case 10 through a feed hose 21. The oil cooler 20 is also in communication with the oil pump provided in the crank case 10 through a return hose 22. As illustrated in FIG. 2, a cooling fan 23 is mounted adjacent to the oil cooler 20. A handle 24 is provided for steering the vehicle. A fuel tank 25 is mounted adjacent to a saddle type seat 26. An oil tank 27 is fitted directly to the front surface of the front case cover 11 and is connected to the oil cooler 20 through the feed hose 21 and the return hose 22. The oil tank 27 is also connected to the oil pump incorporated in the power unit 4.

Figure 3:
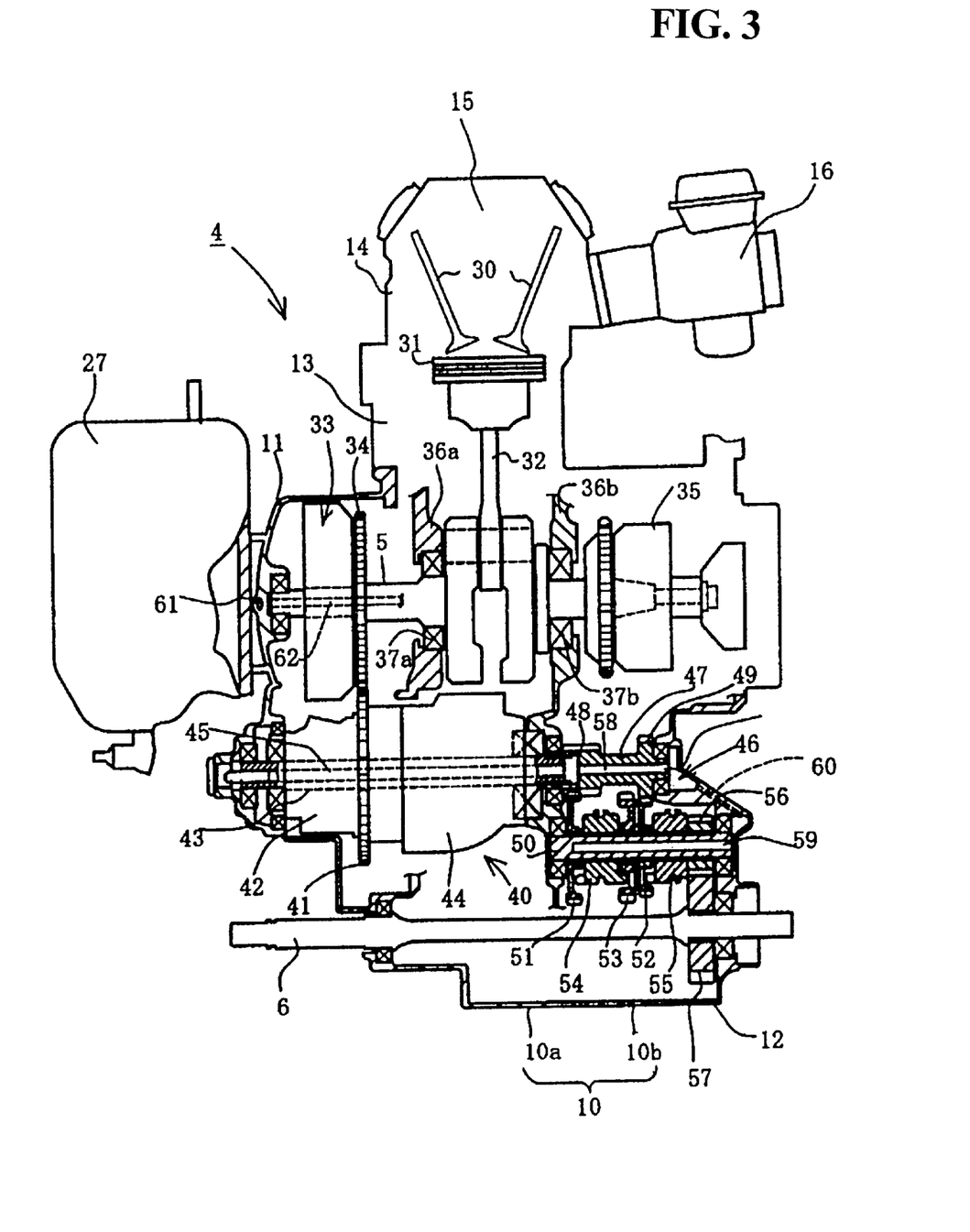
FIG. 3 is a vertical sectional view of a power unit for the present invention.

Next, the power unit will be described in detail referring mainly to FIG. 3. A valve 30, a piston 31, a connecting rod 32 and a starting clutch 33 of a centrifugal clutch mechanism are provided at one end of the crank shaft 5. A primary driving gear 34 is rotated as one body with a clutch outer, and an ACG 35 is provided on the other end side.

The crank shaft 5 is borne by main bearings 37a, 37b at journal walls 36a, 36b integral respectively with the front case 10a and the rear case 10b. An oil hydrostatic non-stage transmission 40 is incorporated in the crank case 10 constituting the engine portion of the power unit 4, and roughly one half in the longitudinal direction of the oil hydrostatic non-stage transmission 40 overlaps with the main bearings 37a, 37b.

Figure 4:
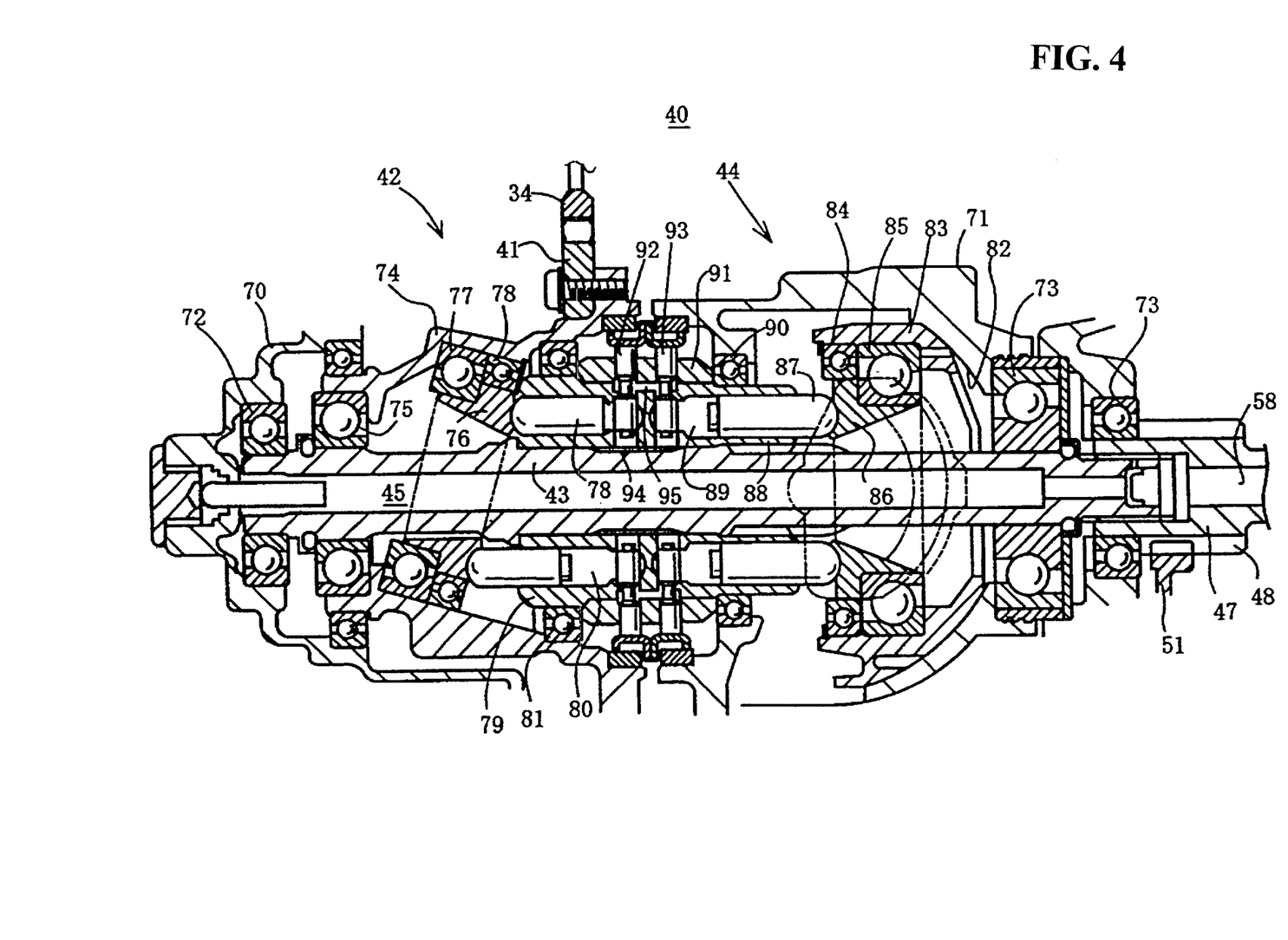
FIG. 4 is a sectional view of an oil hydrostatic non-stage transmission of the present invention.

In the oil hydrostatic non-stage transmission 40, an oil hydraulic pump 42 is driven by a primary driven gear 41 in mesh with a primary driving gear 34 and an oil hydraulic motor 44 is driven by oil discharged from the pump 42 and provides an output for a change in speed to a driving shaft 43, which is a speed change shaft in the present invention. These units are disposed side by side on the driving shaft 43. The driving shaft 43 is disposed so that its axis coincides with the front-rear direction in parallel with the crank shaft 5. The driving shaft 43 is provided along its axis with an oil passage 45 penetrating in the longitudinal direction (FIG. 4). The primary driving gear 34 and the oil hydrostatic non-stage transmission 40 constitute primary speed change means. One end of the driving shaft 43 is directly connected to a main shaft 47 of a staged speed change gear 46 by a spline connection.

The main shaft 47 is provided integrally with a first speed driving gear 48 and a second speed driving gear 52, which are engaged respectively with a first speed driven gear 51 and a second speed driven gear 52 rolling on a counter shaft 50 parallel with the main shaft 47. A reverse driven gear 53 is rollably disposed on the counter shaft 50, and, though not seen in FIG. 4, a reverse idle gear meshes with the first speed driving gear 48 on another shaft, whereby the reverse driven gear 53 is rotated in a direction opposite to the rotating direction of the first speed driven gear 51 and the second speed driven gear 52.

Shifters 54, 55 are axially movably spline-connected onto the counter shaft 50. When the shifter 54 is moved leftwardly in FIG. 3, rotation of the first speed driven gear 51 is transmitted from the counter shaft 50 to a final driving gear 56 formed integrally with an end of the counter shaft 50, and is transmitted to the output shaft 6 through a final driven gear 57 provided on the output shaft 6 and meshing with the final driving gear 56.

When the shifter 55 is moved to the left, rotation of the second speed driven gear 52 is similarly transmitted to the output shaft 6 for driving the vehicle at a second speed. When the shifter 54 is moved to the right, rotation of the reverse driven gear 53 is transmitted to the counter shaft 50 to reversely rotate the counter shaft 50, whereby the output shaft 6 is reversely rotated for driving the vehicle rearwardly. The staged speed change gear 46, the final driving gear 56 and the final driven gear 57 constitute secondary speed change means.

The main shaft 47 is provided along its axis with an oil passage 58 communicated with the oil passage 45 of the driving shaft 43, and the counter shaft 50 is also provided along its axis with an oil passage 59. The oil passage 59 is closed on the inner side, and is opened on the outer side towards an oil passage 60 provided in the wall thickness of the rear case cover 12. The oil passage 59 is supplied with oil passing through the main shaft 47. Valve mechanisms of the cylinder head 14 and the ACG 35 are lubricated by an oil passage provided in the rear case cover 12 separately from the oil passage 60. Further, the crank shaft 5 also is provided along its axis with an oil passage 62, and is supplied with oil from an oil passage 61 provided in the front case cover 11, whereby the bearing portions of the crank shaft 5 and the starting clutch 33 are lubricated.

Next, the structure of the oil hydrostatic non-stage transmission 40 will be outlined referring to FIG. 4. Housings 70 and 71 of the oil hydraulic pump 42 and the oil hydraulic motor 44 constituting the oil hydrostatic non-stage transmission 40 are respectively formed integrally with the front case cover 11 and the front case 10a, and both ends of the driving shaft 43 are rotatably supported by the housings 70, 71 through bearings 72, 73.

In the oil hydraulic pump 42, an input side rotating portion 74 rotated as one body with the primary driven gear 41 is rotatably supported on the driving shaft 43 through a bearing 75, and, on the inner side thereof, a fixed swash plate 76, inclined relative to the axial direction of the driving shaft 43, is rollably supported through bearings 77, 78. A plurality of pump-side plungers 78 having tip ends in slidable contact with the fixed swash plate 76 are moved forwardly and rearwardly in pump plunger holes 80 disposed in a ring formed around an axis, relative to a pump cylinder 79 provided on the driving shaft 43, thereby performing an oil intake stroke and discharge stroke. An outer peripheral portion of the pump cylinder 79 supports the input-side rotating portion 74 relatively rotatably through a bearing 81.

On the other hand, in the oil hydraulic motor 44, a swash plate holder 83 having a bowl like shape is rollably supported in a concave surface portion 82 formed in the housing 71, and a movable swash plate 86 is rollably supported in the concave surface through bearings 84, 85. The swash plate holder 83 and the movable swash plate 86 constitute the speed change swash plate according to the invention. Relative to the surface of the movable swash plate 86, a number of motor-side plungers 87 corresponding in number to the pump-side plungers 78 are moved forwardly and rearwardly in motor plunger holes 89 provided in a ring-like form around the axis of a motor cylinder 88 provided on the axis of the driving shaft 43, thereby performing a projecting stroke and a receding stroke.

The motor-side plungers 87 project due to the pressure of oil discharged by the pump-side plungers 78 to push a surface of the movable swash plate 86, whereby the motor cylinder 88 is rotated. Since the inside peripheral surface of the motor cylinder 88 is in spline connection with the outside periphery of the driving shaft 43, an input from the primary driven gear 41 is outputted to the driving shaft 43 with a speed change. The speed change ratio can be regulated by varying the inclination of the movable swash plate 86, and the inclination of the movable swash plate 86 can be freely varied by turning the swash plate holder 83. The outside periphery of the motor cylinder 88 is rotatably supported by the housing 71 through a bearing 90.

The pump cylinder 79 and the motor cylinder 88 are integrated at a large diameter portion 91 at the center, and, here, pump-side valves 92 and motor-side valves 93 proceed radially are arranged in two rows and in a ring form, the number of the valves being the same as the number of the pump-side plungers 78 and the motor-side plungers 87. The pump-side valves 92 and the motor-side valves 93 open and close communicating portions between an inside passage 94 and an outside passage 95, which are formed concentrically on the inside of the large diameter portion 91, and the pump plunger holes 80 and the motor plunger holes 89.

Namely, in an intake stroke of the pump-side plungers 78, the pump-side valves 92 open the portions between the pump plunger holes 80 and the inside passage 94, and close the portions between the pump plunger holes 80 and the outside passage 95; this is reversed in a discharge stroke. Similarly, in a projecting stroke of the motor-side plungers 87, the motor-side valves 93 open the portions between the motor plunger holes 89 and the outside passage 95, and close the portions between the motor plunger holes 89 and the inside passage 94; this is reversed in a receding stroke.

Next, a ratio change mechanism 120 for changing the inclination angle of the movable swash plate 86 to vary the change gear ratio will be described referring to FIG. 5. One end of a link arm 63 protruding to the outside of the housing 71 from the swash plate holder 83 rollably containing the movable swash plate 86 is turnably connected by a pin 63a to a slider 65 on a ball screw 64 which is a ratio change driving shaft according to the present invention, and the ball screw 64 is rotated forwardly or reversely to axially move the slider 65 to the left or right side, whereby the inclination of the movable swash plate 86 can be varied. Both ends of the ball screw 64 are rotatably supported through bearings 67, 68 on stays 66a, 66b integral with the housing 71, and a driven gear 69 is fitted to one end of the ball screw 64.

The driven gear 69 is driven by an output gear 102 of an electric motor 101 through a torque limiter 100. The torque limiter 100 comprises a rotary shaft 104 of which both ends are supported by a housing 103 on the side of the oil hydraulic pump 42 and the stay 66a on the side of the oil hydraulic motor 44. A second speed reduction gear 105 meshing with and smaller in diameter than the driven gear 69 is provided at one end of the rotary shaft 104, and a first speed reduction gear 106 meshing with and larger in diameter than the output gear 102 of the electric motor 101 is provided at the other end of the rotary shaft 104.

The first speed reduction gear 106 comprises a cylindrical member 108 connected or non-connected to the rotary shaft 104 through a plurality of friction plates (not seen in the figure), and the friction plates are pressed by a set spring 109 consisting of a coil spring from the side of the second speed reduction gear 105, whereby a friction plate clutch mechanism is constituted.

Therefore, in a normal condition where a torque not more than a set load of the set spring 109 is transmitted between the output gear 102 of the electric motor 101 and the driven gear 69, the rotation of the output gear 102 is transmitted from the first speed reduction gear 106 to the rotary shaft 104 through the cylindrical member 108 and the friction plates on the inner side thereof, and is further transmitted from the second speed reduction gear 105 to the ball screw 64 through the driven gear 69.

As a result, when the ball screw 64 is rotated, the slider 65 is moved accordingly, and the swash plate holder 83 is turned through the link arm 63, whereby the inclination of the movable swash plate 86 supported on the inner side of the swash plate holder 83 is varied, and the change gear ratio is thereby regulated. When the torque transmitted between the output gear 102 and the driven gear 69 exceeds the set load of the set spring 109, slip occurs among the plurality of friction plates, and the rotation of the first speed reduction gear 106 is not transmitted to the rotary shaft 104 but intercepted.

The electric motor 101 is supported by a housing 103 on the side of the oil hydraulic pump 42, and is controlled with respect to normal and reverse rotations and quantity of rotation so as to obtain a required change gear ratio, by a controlling portion provided separately.

Figure 1:
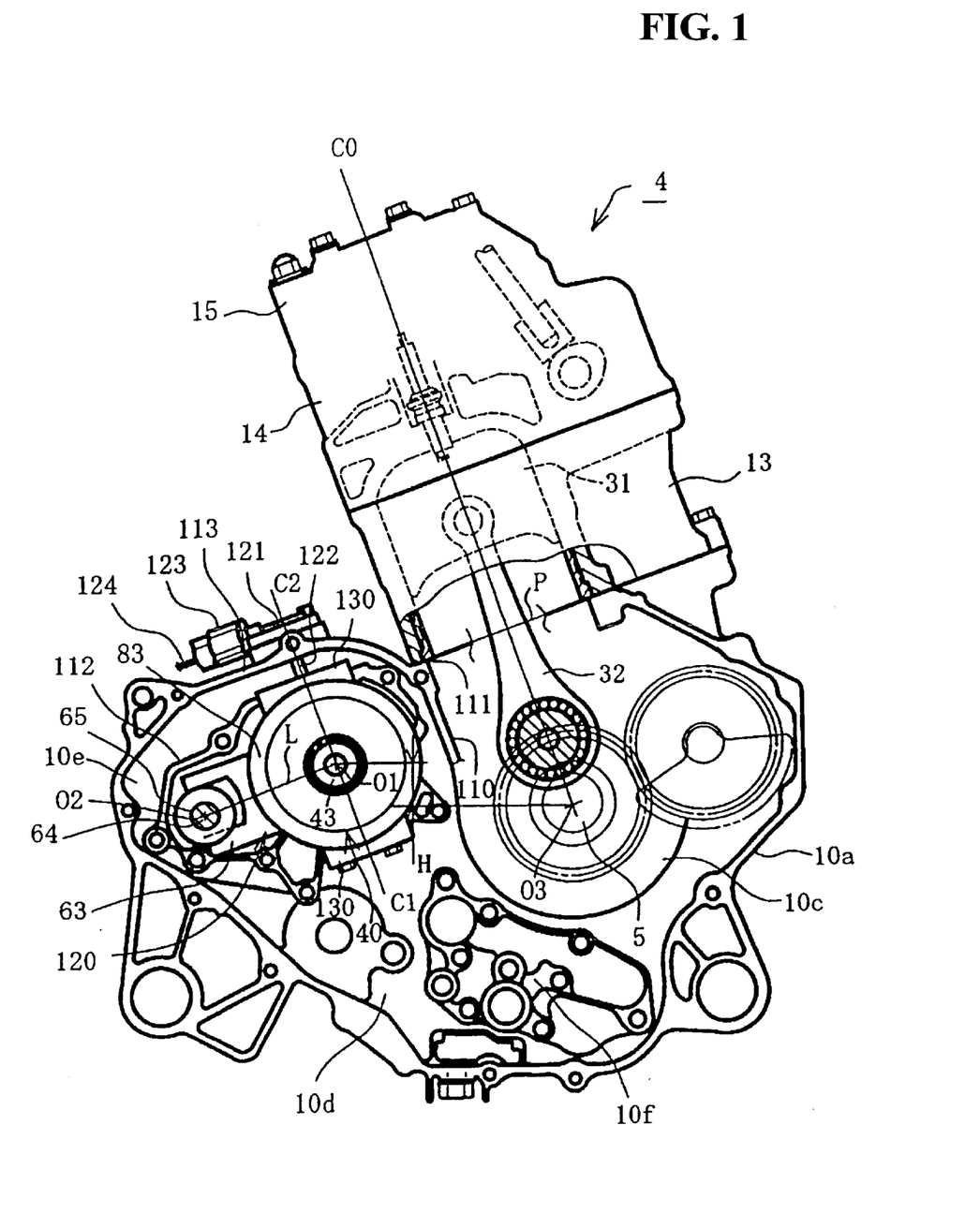
FIG. 1 is a view showing the layout of the ratio change mechanism according to the present invention.
Figure 6:
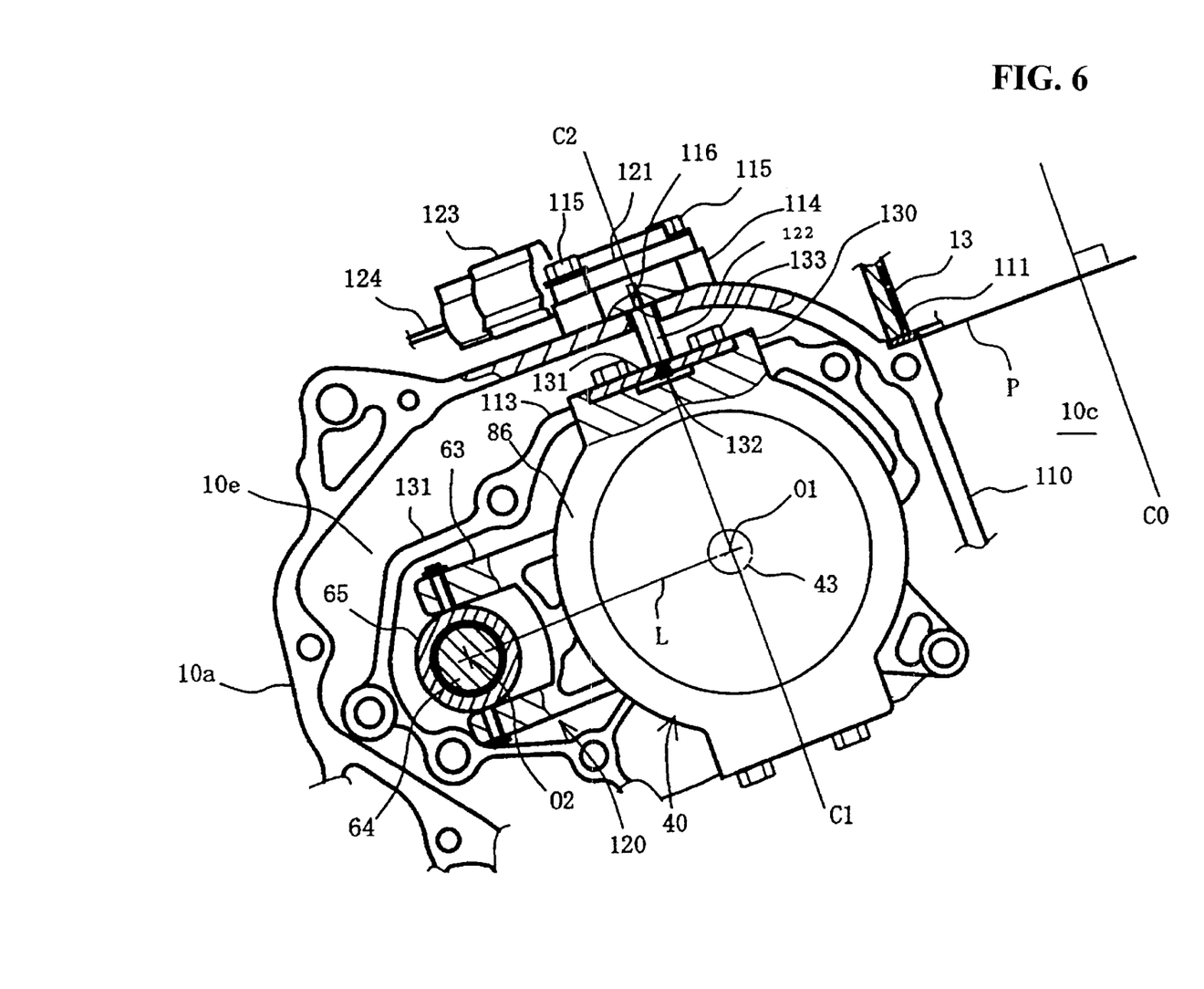
FIG. 6 is an enlarged view of a major part showing the layout of the ratio change mechanism.

Next, the layout of the ratio change mechanism 120 will be described referring mainly to FIGS. 1 and 6. FIG. 1 shows the interior of the front case 10a as viewed in a split plane on the front case 10a and the rear case 10b from the rear side of the vehicle. FIG. 6 is an enlarged view of the portion of the ratio change mechanism 120 in FIG. 1. First, as is clear from FIG. 1, a crank chamber 10c of the front case 10a is surrounded by a crank chamber wall 110 opening upwardly.

Though not clear from FIG. 1, the rear case 10b also has the same structure, and an opening portion traversing the mating portion of the front case 10a and the rear case 10b is provided on an upper portion of the crank case 10 formed by mating the front case 10a and the rear case 10b. The opening portion is covered by the cylinder block 13 stacked from the upper side. The cylinder block 13 is a member constituting the cylinder in the present invention. In the following description, the same structural portions on the side of the rear case 10b is in principle omitted, and description of the front case 10a based on the figures will be given as representative of the crank case 10.

A packing 111 (See FIG. 6) is interposed at the mating plane P of a lower end portion of the cylinder block 13 and a peripheral portion of the opening portion at an upper portion of the front case 10a to seal the mating plane P. which is orthogonal to the cylinder axis C0. A side portion of the front case 10a forms a transmission case portion 10d extending sideways from the crank chamber 10c. A transmission containing portion 10e for the swash plate type oil hydrostatic non-stage transmission 40 is provided at an upper portion of the transmission case portion 10d. An oil pump containing portion 10f is provided at a lower portion of the transmission case portion 10d. The transmission containing portion 10e is provided with a transmission fixing wall 112, to which the swash plate type oil hydrostatic non-stage transmission 40 is fixed. Turning shafts 130 integrally projected at upper and lower symmetric positions of the swash plate holder 83 and are turnably supported.

The turning axis C1 of the swash plate holder 83 is a line segment which passes through the center O1 of the driving shaft 43 and connects the centers of the upper and lower turning shafts 130. The swash plate holder 83 can be turned around the turning axis C1, which is parallel with the cylinder axis C0. The center O1 of the driving shaft 43 is located on the upper side of the center O3 of the crank shaft 5 with a distance H therebetween, while the swash plate type oil hydrostatic non-stage transmission 40 as a whole is disposed adjacent to the crank chamber wall 110 and located on the lateral side of and in the vicinity of the cylinder block 13.

Figure 5:
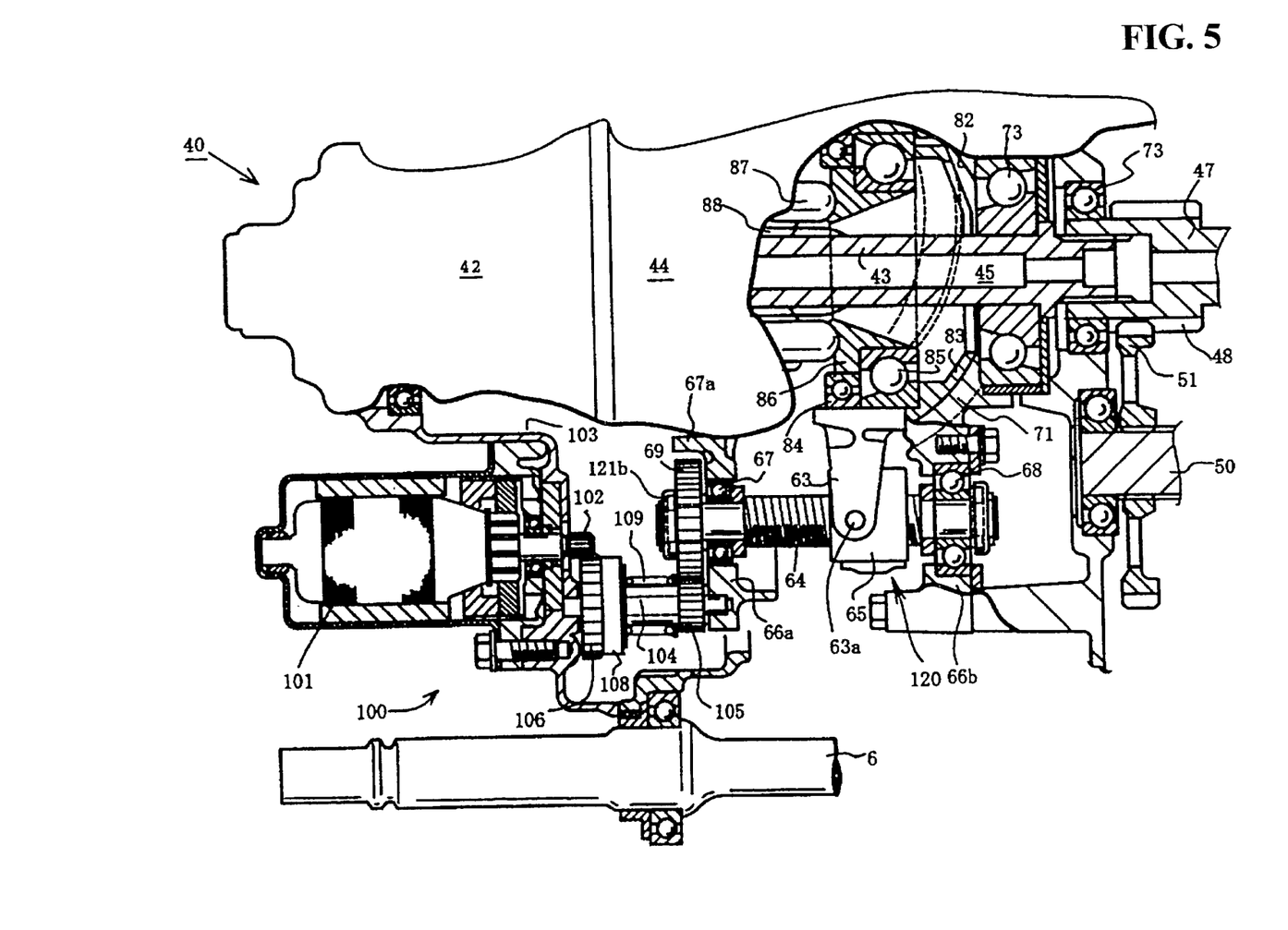
FIG. 5 is a sectional view of a major part of a ratio change mechanism of the present invention.

The ratio change mechanism 120 disposed on a lateral side of a main body portion of the swash plate type oil hydrostatic non-stage transmission 40, as is clear from FIGS. 5 and 6, comprises the swash plate holder 83, the slider 65 connected by a pin 63a to the link arm 63 projecting towards a side portion of the swash plate holder 83, and the ball screw 64 supporting the slider 65.

The ball screw 64 is disposed in parallel to the driving shaft 43 (corresponding to the speed change shaft in the present invention) of the oil hydraulic motor 44. A line segment L connecting between the center O1 of the driving shaft 43 and the center O2 of the ball screw 64 is a straight line directed upwardly and to the right in the FIG. 6, is parallel with the mating plane P of the crank case 10 and the cylinder block 13, and is orthogonal to the turning axis C1. Conversely, the cylinder axis C0 is slanted upwardly to the left side of the vehicle, namely, is slanted opposite to the inclination of the line segment L.

Further, in order to detect the turning angle of the swash plate holder 83, a ratio detecting sensor 121 is fixed by bolts 115 to a boss 114 preliminarily projecting at an upper surface of an upper wall 113 of the front case 10a. The ratio detecting sensor 121 is a known potentiometer, and a detecting shaft 122 constituting a detecting portion of the sensor 121 passes through a through-hole 116 of the upper wall 113 and protrudes downwardly inside the transmission containing portion 10e. A lower end portion of the detecting shaft 121 is inserted into a through-hole 132 formed at a central portion of a connecting plate 131 fitted to the turning shaft 130, and is turned as one body with the connecting plate 131 around an axis C2.

Since the through-holes 116 and 132 are located on the turning axis C1, the axis C2 of the detecting shaft 122 penetrating the through-holes coincides with the turning axis C1. On the other hand, the connecting plate 131 is fixed to a top face of the turning shaft 130 by bolts 133 and is integrated with the turning shaft 130. Therefore, when the swash plate holder 83 is turned, the detecting shaft 122 connected to the connecting plate 131 is integral with the swash plate holder 83 is turned around the axis C2 as one body with the connecting plate 131. The turning angle of the connecting plate 131 coincides with the turning angle of the swash plate holder 83.

As a result, the turning angle of the swash plate holder 83 is transmitted as the turning angle of the detecting shaft 122 to the ratio detecting sensor 121, where a signal corresponding to the turning angle of the detecting shaft 122, namely, the turning angle of the swash plate holder 83 is outputted through a coupler 123 and a signal wire 124 to the above-mentioned controlling portion, whereby the turning angle of the swash plate holder 83 can be detected accurately.

Incidentally, the detecting shaft 122 is connected directly to the turning shaft 130 by the connecting plate 131 serving as a part of the turning shaft 130, so that there is no need for the presence of another member for connecting the ratio detecting sensor 121 and the swash plate holder 83. In addition, since the axis C2 of the detecting shaft 122 coincides with the turning axis C1, the axis C2 is orthogonal to the line segment L connecting between the center O1 of the driving shaft 43 and the center C2 of the ball screw 64, and is parallel with the cylinder axis C0. Further, the machining axes for the boss 114 and the through-hole 116 are also parallel with the axis C2 of the detecting shaft 122 and with the turning axis C1 and the cylinder axis C0.

Next, the effects of the present embodiment will be described. Since the ratio change mechanism 120 is laid out so that the line segment L connecting the center O1 of the driving shaft 43 with the center O2 of the ball screw 64 is parallel to the mating plane P of the front case 10a and the cylinder block 13, the turning axis C1 of the swash plate holder 83 is orthogonal to the line segment L and can be made parallel to the cylinder axis C0. Therefore, the axis C2 of the detecting shaft 122 disposed coaxially with the turning axis C1 can also be made parallel to the cylinder axis C0 (FIG. 1).

As a result, the machining axes of the boss 114 and the through-hole 116 which are the objects of machining of the ratio detecting sensor fitting portion for fitting the detecting shaft 122 can also be made parallel to the cylinder axis C0. On the other hand, the cylinder axis C0 serves also as the machining axis for machining of the crank chamber 10c. Therefore, the machining axis for the ratio detecting sensor fitting portion and the machining axis for the crank chamber 10c are parallel to each other.

Accordingly, when carrying out machining after casting of the front case 10a and the like, the front case 10a is fitted to jigs by positioning it so that the cylinder axis C0 coincides with the machining axis of a machining apparatus, whereby machining thereafter of the ratio detecting sensor fitting portion can be carried out utilizing the same positioning, without repositioning which is required in the prior art. Thus, both portions to be machined can be machined with a single positioning, so that the time and labor of positioning for the machining can be reduced, and workability can be enhanced remarkably.

In addition, since the detecting shaft 122 is connected directly to the swash plate holder 83 on the turning axis C1, the ratio detecting sensor 121 can be simplified in structure. Further, since the detecting shaft 122 can be fitted by inserting it from the outside of the upper wall 113, the ratio detecting sensor 121 can be fitted easily.

Furthermore, since the center O1 of the driving shaft 43 is displaced upwards from the rotational center O3 of the crank shaft 5 by a size H and the swash plate type oil hydrostatic non-stage transmission 40 as a whole is located adjacently to the crank chamber wall 110 and in the lateral vicinity of the cylinder block 13, an output from the crank shaft 5 can be inputted to the swash plate type oil hydrostatic non-stage transmission 40 through the shortest route, and the swash plate type oil hydrostatic non-stage transmission 40 which is a heavy component can be concentrated in the vicinity of the gravity center of the engine. Therefore, a good balance can be obtained when these components are mounted on a vehicle, and the width of the engine as a whole can be reduced.

The present invention is not limited to or by the above embodiment, and a variety of modifications and applications can be made in the principle of the invention. For example, the detecting shaft 122 in the ratio detecting sensor 121 does not necessarily project from the side of the ratio detecting sensor 121, and may be project from the side of the swash plate holder 83. The detecting shaft 122 may be provided as a member moved in conjunction with the swash plate holder 83. Further, the ratio change mechanism 120 is not limited to the one using the ball screw 64, and known various means such as the one in which the swash plate holder 83 is turned directly by a stepping motor and a speed reduction gear train or the like can be applied.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power system for a vehicle in which a rotational output of an engine is decelerated and transmitted to a driving wheel by a swash plate oil hydrostatic non-stage transmission, the inclination angle of a speed change swash plate provided in said swash plate oil hydrostatic non-stage transmission is varied by a ratio change mechanism to vary the change gear ratio, and the variation of the change gear ratio is detected by a ratio detecting sensor having a detecting member moved in conjunction with said speed change swash plate, comprising:

said ratio change mechanism comprises a ratio change driving shaft parallel with a speed change output shaft of said swash plate oil hydrostatic non-stage transmission, and said ratio change mechanism is disposed wherein a line segment connecting between axes of said ratio change driving shaft and said speed change output shaft is parallel with a mating plane between a crank case and a cylinder.

2. The power system for a vehicle according to claim 1, and further including a swash plate holder operatively mounted relative to said swash plate hydrostatic non-stage transmission, said swash plate holder being operatively connected to said ratio detecting sensor for actuating said detecting member as said swash plate holder is moved.

3. The power system for a vehicle according to claim 2, wherein said ratio detecting sensor is a potentiometer.

4. The power system for a vehicle according to claim 2, wherein said detecting member is a shaft having a first end projecting from an opening in an upper wall of a front case and a distal end projecting downwardly to a point adjacent to said swash plate holder and further including a connecting plate connected to said shaft wherein an angle of turning of the swash plate holder coincides with an angle of turning of the connecting plate for imparting movement to said shaft.

5. The power system for a vehicle according to claim 2, and further including a slider operatively connected to said swash plate holder and a screw rotatably mounted within said slider wherein rotation of said screw imparts movement to said slider for imparting movement to said swash plate holder.

6. The power system for a vehicle according to claim 5, and further including a power source operatively connected to said screw for selectively imparting rotation thereto for selectively imparting movement to said slider and said swash plate holder for regulating the degree of the change gear ratio.

7. A power system for a vehicle comprising:

an engine wherein a rotational output of the engine is selectively changed; a swash plate oil hydrostatic non-stage transmission for transmitting rotation to a driving wheel, an inclination angle of a speed change swash plate provided in said swash plate oil hydrostatic non-stage transmission is varied by a ratio change mechanism to vary the change gear ratio;

a ratio detecting sensor having a detecting member moved in conjunction with said speed change swash plate for detecting the variation of the change gear ratio;

said ratio change mechanism including:

a ratio change driving shaft parallel with a speed change output shaft of said swash plate oil hydrostatic non-stage transmission; and said ratio change mechanism is disposed wherein a line segment connecting between axes of said ratio change driving shaft and said speed change output shaft is parallel with a mating plane between a crank case and a cylinder.

8. The power system for a vehicle according to claim 7, and further including a swash plate holder operatively mounted relative to said swash plate hydrostatic non-stage transmission, said swash plate holder being operatively connected to said ratio detecting sensor for actuating said detecting member as said swash plate holder is moved.

9. The power system for a vehicle according to claim 8, wherein said ratio detecting sensor is a potentiometer.

10. The power system for a vehicle according to claim 8, wherein said detecting member is a shaft having a first end projecting from an opening in an upper wall of a front case and a distal end projecting downwardly to a point adjacent to said swash plate holder and further including a connecting plate connected to said shaft wherein an angle of turning of the swash plate holder coincides with an angle of turning of the connecting plate for imparting movement to said shaft.

11. The power system for a vehicle according to claim 8, and further including a slider operatively connected to said swash plate holder and a screw rotatably mounted within said slider wherein rotation of said screw imparts movement to said slider for imparting movement to said swash plate holder.

12. The power system for a vehicle according to claim 11, and further including a power source operatively connected to said screw for selectively imparting rotation thereto for selectively imparting movement to said slider and said swash plate holder for regulating the degree of the change gear ratio.

* * * * *